C. W. MARSH & W. W. MARSH.

Improvement in Harvesters.

No. 127,981.  Patented June 18, 1872.

UNITED STATES PATENT OFFICE.

CHARLES W. MARSH AND WILLIAM W. MARSH, OF SYCAMORE, ILLINOIS.

IMPROVEMENT IN HARVESTERS.

Specification forming part of Letters Patent No. 127,981, dated June 18, 1872.

*To all whom it may concern:*

Be it known that we, CHARLES W. MARSH and WILLIAM W. MARSH, of Sycamore, in the county of De Kalb, in the State of Illinois, have invented a new and useful Improvement in a Self-Raking Device for Grain-Harvesting Machines; and we do hereby declare that the following is a full, clear, and exact description of the same, reference being had to the accompanying drawing making a part of this specification, in which—

Figure 1:
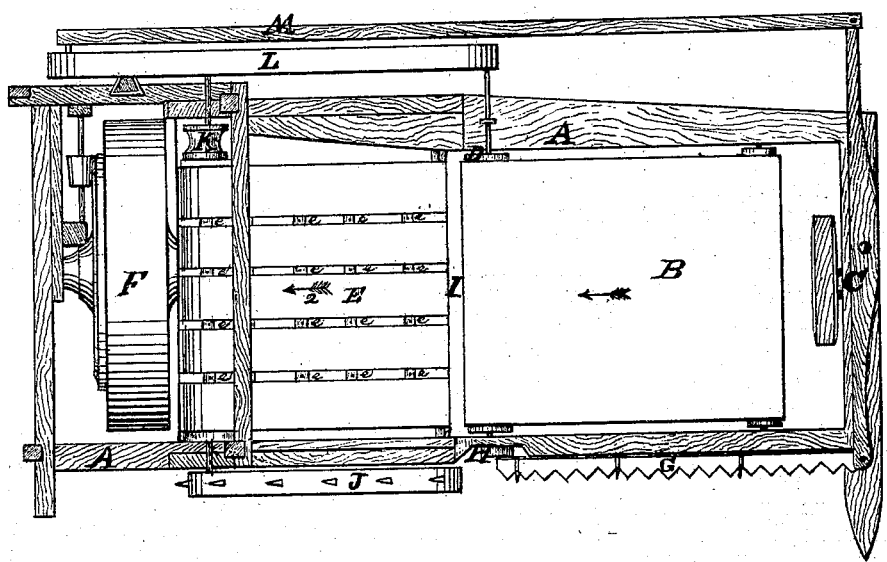
Figure 2:
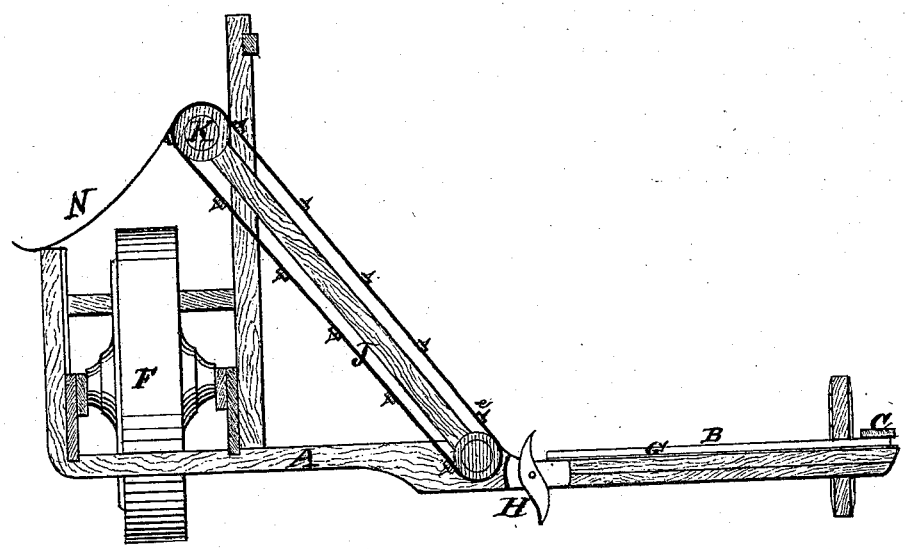

Figure 1 is a plan or top view of the frame and its several parts of a harvester having our invention applied thereto. (Concave or grain receiver not shown in this figure.) Fig. 2 is a front view of the same.

Similar letters of reference indicate corresponding parts in the two figures.

To enable those skilled in the art to fully understand and construct our invention, we will proceed to describe it.

A represents a horizontal rectangular frame, in which a horizontal endless apron, B, is placed, next to the grain-wheel C, extending the whole width of frame A, moving in the direction indicated by arrow 1 around drum D. E represents a slotted platform, covering an endless band of rakes, the teeth *e e e*, &c., of which protrude through and move up the slots in said platform E in the direction indicated by arrow 2. F is the drive-wheel with gearing attached. G is the sickle, of ordinary construction. H is a beater, constructed in the form as shown, and attached to the end of shaft of drum D, said shaft reaching through the front beam of frame A for such attachment, and extended so that in revolving with drum D its points or arms shall reach above the plane of apron B. I represents an open space between apron B and slotted platform E. J represents an outside-toothed elevating-belt, running in conjunction with and upon same inclined plane as the endless band of rakes around drum K, on extended end thereof. Said band of rakes and toothed belt, together with apron B, are moved by belt L, motion being given to the same and to the sickle G by gear driven by drive-wheel F, the reel and lesser parts being of the ordinary kind.

The operation is as follows: As the harvester is drawn along the grain is cut by the sickle G, and falling backward is received upon the revolving apron B, except that portion of the ends of the straws or stalks next the cut, reaching from the edge of the sickle back to said apron B. Hence it follows, as the apron B conveys the cut grain toward the elevating band of rakes, that these ends "next the cut" will be liable to lag or get behind, so that the stalks will not be delivered to the band of rakes and toothed belt perfectly straight and parallel with each other.

It will be observed further that there will be an open space between the end of the sickle and the toothed belt, where the cut ends would sag and the stalks would slip forward, to correct which irregularity we have placed the beater H upon the end of the shaft of the drum D. As said drum revolves the apron B it also revolves the beater H, the points of which in its revolution are continually knocking the delayed or lagging cut ends around to position at right angles with the course of apron B, and keep said ends of stalks from sagging and slipping forward over the space between the end of the sickle and toothed belt.

Thus it will be seen that the grain will be delivered from the revolving apron B to the endless band of rakes upon slotted platform E and toothed belt J in a horizontal position parallel with the rakes, in which condition it will be delivered by the said band of rakes and toothed belt into a receptacle or grain-receiver, N, which should be at the upper end of the said band and belt last mentioned, and connected to the slotted platform over said band of rakes, as shown in Fig. 2, whence it may be taken and bound with facility by the binders standing on platform provided for them, as in the machine known as the "Marsh Harvester," or otherwise be disposed of.

Furthermore, the inequalities of the ground in a harvest-field, and the consequent sudden motion given to the reel, often knock stalks of grain, but more especially large and tall weeds, around parallel with the sickle, so that they move toward the slotted platform E and are delivered thereon ends first. As the grain is being elevated these "stray" stalks slide down between the rows of teeth (which cannot reach them) in the position described, and would stick and remain between apron B and the lower end of slotted platform E till enough might be collected to clog the same, if it were not that we have provided there the open space I, through which said "stray" stalks of grain or weeds slip down and fall into the stubble out of the way, thus not impeding the course of the grain moving up the slotted platform into the grain-receptacle, as before mentioned.

Having thus described our invention, we claim as new and desire to secure by Letters Patent—

1. The beater H, when used in connection with endless apron B and toothed belt J, substantially as set forth.

2. The arrangement of beater H upon the extended end of shaft of drum D so that beater H and drum D shall have corresponding motion, as set forth.

CHARLES W. MARSH.
WILLIAM W. MARSH.

Witnesses:
N. C. WARREN,
E. CRIST.